May 29, 1945. C. E. TACK 2,377,190
ROTOR BRAKE
Filed June 26, 1942 2 Sheets-Sheet 1
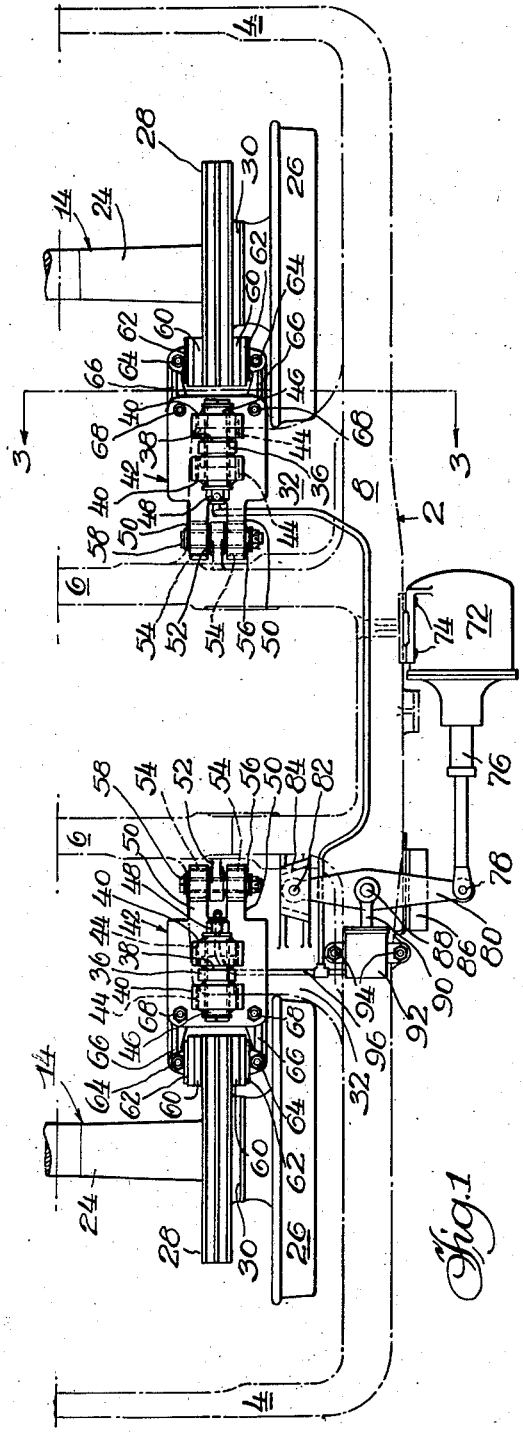
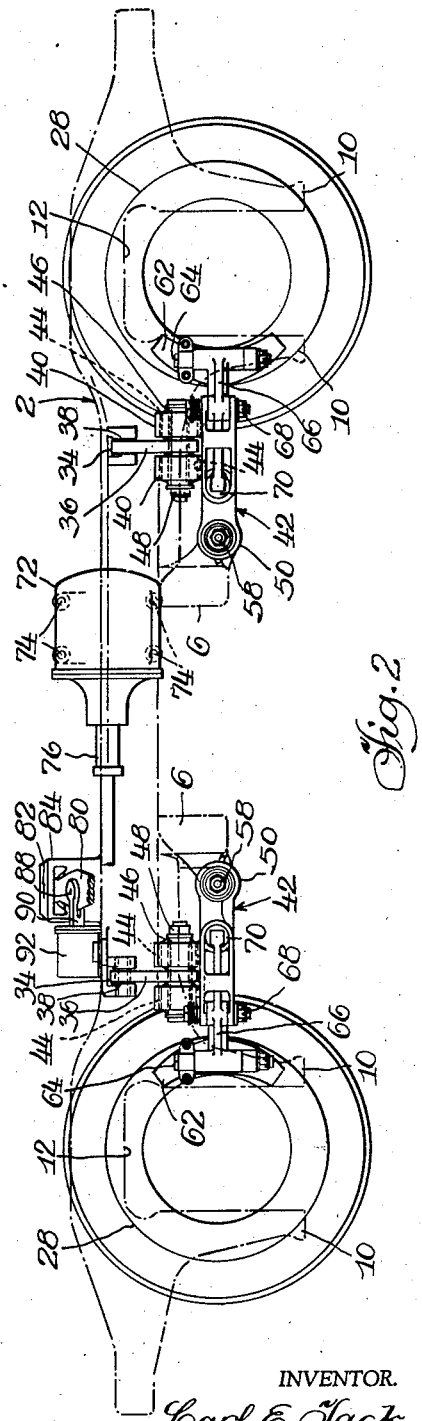
INVENTOR.
Carl E. Tack
BY
Atty

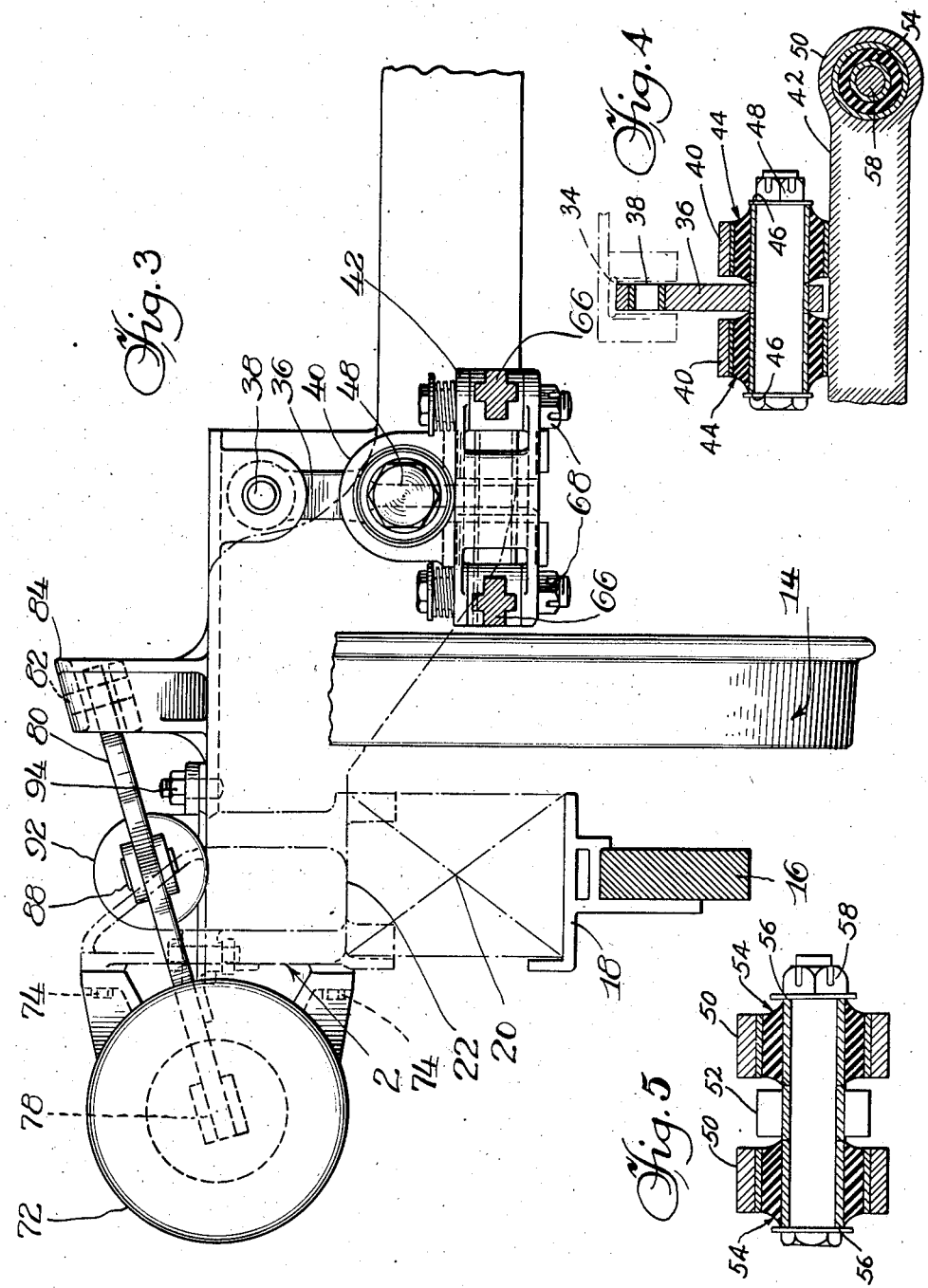

Patented May 29, 1945

2,377,190

UNITED STATES PATENT OFFICE 2,377,190

ROTOR BRAKE

Carl E. Tack, Chicago, Ill., assignor to American Steel Foundries, Chicago, Ill., a corporation of New Jersey Application June 26, 1942, Serial No. 448,524

24 Claims. (Cl. 188—153)

This invention relates to brake rigging and more particularly to rigging for an off-wheel brake arrangement for a railway car truck in which brake discs are rotatably mounted on the wheel and axle assemblies, each disc being braked by friction shoes at opposite sides thereof.

An object of my invention is to devise an off-wheel brake arrangement in which the brake shoes are suspended from the truck frame in such manner as to snub, during actuation of said shoes, vertical movements of the truck frame which is spring supported from the wheel and axle assemblies in the usual manner.

A more specific object of my invention is to provide a separate brake frame for the rigging associated with each brake disc, said frame affording a pivotal fulcrum for the brake levers associated with said disc, and said brake frame being supported solely from the truck frame. It will be readily apparent to those skilled in the art that by thus supporting the brake frame, relative vertical movement between the wheel and axle assembly and the truck frame will be snubbed by means of the brake rigging during actuation thereof.

A still more specific object of my invention is an arrangement whereby each brake frame is afforded a resilient two point support from the truck frame, said two point support comprising a pivotal connection between the top of the brake frame and the truck frame and an additional connection between the truck frame and the end of the brake frame remote from the associated brake disc, said connections permitting but resiliently restraining vertical, lateral, longitudinal, and twisting movement of the brake frame with respect to the truck frame.

In my novel arrangement the brake frame is provided with a pair of lugs on the top thereof and a pair of lugs on the end thereof remote from the associated brake disc, each of said lugs being bushed with an annular resilient bushing. A pivotally hung link projects between the lugs on the top of the brake frame and is connected thereto by means of a bolt and nut assembly, and the lugs on the end of the brake frame are similarly bushed and similarly connected to a lug formed on the truck frame.

It will be apparent that by means of the support above described, lateral movement of the brake frame with respect to the truck frame will be resisted in direct shear by the bushings associated with the end lugs and will be resisted in torsional shear by the bushings associated with the top lugs.

In the drawings,

Figure 1 is a plan view of a railway car truck embodying my invention, only one-half of the truck being shown inasmuch as it is similar at opposite sides thereof.

Figure 2 is a side elevation of the arrangement shown in Figure 1, and Figure 3 is an enlarged sectional view taken in the transverse vertical plane indicated by the line 3—3 of Figure 1.

Figures 4 and 5 are sectional views through the supporting lug structure of one of the brake frames shown in Figures 1 and 2, Figure 4 being a sectional view in a vertical longitudinal plane substantially bisecting said structure, and Figure 5 being a sectional view in a transverse vertical plane substantially bisecting the structure connecting the brake frame to the adjacent truck frame transom.

In each of said figures, certain details may be omitted where they are more clearly shown in other views.

Describing my invention in detail, the truck frame generally designated 2 comprises the end rails 4, 4, the spaced intermediate transoms 6, 6 and the side rail 8 at each side of the frame and integral with said end rails and said transoms, said transoms affording a means of support for an interposed bolster member (not shown) upon which may be mounted an associated car body. At each end thereof each side rail is formed with a pair of pedestal jaws 10, 10 defining a pedestal opening 12 receiving therewithin a journal box (not shown), said box affording journal means for the associated wheel and axle assembly generally designated 14. It will be understood that the journal boxes at each side of the truck afford support in the usual manner for an equalizer 16, said equalizer supporting adjacent each end thereof a spring seat 18 supporting and positioning a spring group 20, diagrammatically indicated in Figure 3, said spring group being seated at 22 against the adjacent portion of the truck frame and affording support therefor in the usual manner.

It will be understood by those skilled in the art that the spring groups 20, 20 comprise a plurality of coil springs, the harmonious oscillation of which may, under certain circumstances, result in deleterious effects upon the truck structure, and it will be also understood that said harmonious oscillation may cause the wheel and axle assemblies 14, 14 to be unloaded of the weight of the truck frame 2 during the braking of said assemblies, and it is believed that this unloading may cause skidding of the wheels upon the associated rails during the braking of the truck. An object of this invention is to prevent the unloading of the wheel and axle assemblies 14, 14 during actuation of the brake rigging, as hereinafter more fully described.

Each wheel and axle assembly 14 comprises an axle 24, wheels 26, 26 mounted thereon, and a brake disc 28 concentric with the axle 24 and secured at 30 to the hub of the adjacent wheel. A gusset 32 is integrally formed with the truck frame 2 at the juncture of each transom 6 with each side rail 8, and each gusset 32 comprises the depending jaw 34 receiving the upper end of a link or hanger 36 pivotally connected therein as at 38, the lower end of said hanger being received between the upstanding lugs 40, 40 on the associated brake frame or housing generally designated 42 and being secured thereto as hereinafter described.

Each of the lugs 40, 40 comprises an opening receiving a composite bushing 44 formed of an annular pad of rubber or any other suitable resilient material, said pad having annular metal plates vulcanized respectively to the inner and outer peripheries thereof and said bushings 44, 44 are tightly fitted in the openings in respective lugs 40, 40 in any convenient manner.

The inner annular metal plate of each bushing 44 extends outwardly of the associated lug 40 as at 46 for engagement with a bolt and nut assembly 48 extending therethrough and it will be readily apparent to those skilled in the art that as the bolt and nut assembly 48 is tightened, the resilient pads are distorted in shear as the inner annular metal plates of the respective bushings 44, 44 are urged into engagement with the adjacent sides of the link or hanger 36. If desirable the abutting edges of the hanger 36 and the inner annular metal plates of the composite bushings 44, 44 may be provided with complementary teeth and notches whereby the hanger and said plates will be efficiently interlocked. However, it is believed that under ordinary circumstances the friction developed between the hanger and the inner plates as the bolt and nut assembly 48 is tightened will provide an adequate interlocking means.

The end of the box-like brake frame or housing 42 remote from the associated brake disc 28 is provided with a pair of spaced lugs 50, 50 receiving therebetween a lug 52 formed on the associated transom 6, each of the lugs 50, 50 being provided with a composite resilient bushing 54 extending outwardly therefrom at 56 as in the case of the bushings 44, 44 previously described. The lug 52 on the transom is connected to the lugs 50, 50 on the brake frame in a manner substantially identical with the connection of the lugs 40, 40 to the link or hanger 36 by means of a bolt and nut assembly 58.

Braking means is provided for each brake disc 28 and is supported from the associated brake frame 42 as hereinafter described, said brake means comprising the spaced friction shoes 60, 60 arranged for engagement with opposite sides of the disc 28 and carried by respective brake heads 62, 62, each of said brake heads being pivotally connected at 64 to the associated brake lever 66, said lever extending into the associated housing 42 and pivotally fulcrumed therein at 68, the inner ends of the levers 66, 66 being operatively connected to a hydraulic cylinder 70 (Figure 2) carried by the brake frame 42.

Actuating means for the brake rigging at each side of the truck comprises an air cylinder 72 secured at 74, 74 to the associated side rail 8, the piston rod 76 associated with said cylinder being pivotally connected at 78 to the outboard end of the diagonally arranged dead cylinder lever 80, said lever being pivotally fulcrumed at 82 from the bracket 84 formed on the associated gusset 32, said cylinder lever being supported adjacent the outboard end thereof by means of a bracket 86 supported on the truck frame 2 and being pivotally connected intermediate its ends as at 88 to the piston rod 90 associated with the master hydraulic cylinder 92 secured at 94, 94 to the side rail 8.

It will be readily understood by those skilled in the art that upon actuation of the air cylinder 72 the piston rod 76 will be moved to the left as shown in Figures 1 and 2, said piston rod causing the dead cylinder lever 80 to urge the piston rod 90 inwardly with respect to the master hydraulic cylinder 92 whereby actuating fluid in said master cylinder will be conveyed by means of the supply line 96 to the hydraulic cylinders 70, 70 supported from the brake frames 42, 42 and operatively associated with the brake levers 66, 66 as heretofore described, said supply line 96 being afforded resilient connection to the hydraulic cylinders 70, 70 in order to permit lateral and longitudinal movement of the brake frames 42, 42 in a manner hereinafter more fully described, and it will be understood that by modifying the pivotal connection at 88 the mechanical advantage obtained by the dead cylinder lever 80 may be varied so that the brake arrangement described may be readily adapted to cars of various weights.

It will be apparent to those skilled in the art that upon actuation of the brake shoes 60, 60 oscillations of the springs comprising the spring groups 20, 20 will be snubbed and unloading of the wheel and axle assemblies 14, 14 will be thereby prevented, thus decreasing possibility of the skidding of the wheels 26, 26 upon the associated rails.

Movement of each wheel and axle assembly 14 with respect to the truck frame 2 during actuation of the brake rigging will be accommodated by the connection of the associated brake frame 42 to the truck frame, and it will be apparent upon consideration of Figures 1 to 3, that lateral movement of the wheel and axle assembly 14 with respect to the truck frame will be resisted in direct shear by the bushings 54, 54 and will be resisted in torsional shear by the bushings 44, 44, longitudinal movements of the wheel and axle assembly with respect to the truck frame being resisted in compression by the bushings 54, 54 and in direct shear by the bushings 44, 44. Vertical and twisting movements of the wheel and axle assembly with respect to the truck frame will be resisted in compression by all of the bushings.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a vehicle frame, spaced supporting wheel and axle assemblies, rotatable brake discs mounted thereon, a brake frame adjacent each disc, means supporting said brake frame from said vehicle frame and comprising resilient means adapted to resist relative movement between the brake frame and the vehicle frame in every direction, brake levers fulcrumed on said brake frame, friction shoes carried by respective levers for engagement with opposite sides of said disc, a hydraulic cylinder on each brake frame and operatively associated with adjacent levers, an air cylinder mounted on said vehicle frame, a dead cylinder lever fulcrumed from the vehicle frame and operatively connected to the air cylinder, and a master hydraulic cylinder mounted on the vehicle frame and adapted to be actuated by said cylinder lever and operatively connected to the first-mentioned hydraulic cylinders.

2. In a brake arrangement, a vehicle frame, spaced supporting wheel and axle assemblies, brake discs mounted on said assemblies, friction means for engagement with opposite sides of each disc, brake levers operatively connected to respective friction means, hydraulic cylinders associated with said levers, and actuating means comprising an air cylinder mounted on said frame, a dead cylinder lever operatively connected at one end thereof to said air cylinder and pivotally fulcrumed at the opposite end thereof from said frame, a master hydraulic cylinder mounted on said frame, means conveying actuating fluid from said master cylinder to said first-mentioned hydraulic cylinders, and an operative connection between an intermediate portion of said cylinder lever and said master hydraulic cylinder.

3. In a brake arrangement, a vehicle frame, spaced supporting wheel and axle assemblies, rotatable brake discs mounted on said assemblies, a brake frame hung from the vehicle frame adjacent each disc, brake levers fulcrumed on said brake frame, friction shoes carried by respective levers for engagement with opposite sides of said disc, a hydraulic cylinder on each brake frame and operatively associated with adjacent levers, an air cylinder mounted on said vehicle frame, a diagonally arranged dead cylinder lever fulcrumed at one end thereof from the vehicle frame and operatively connected at the opposite end thereof to the air cylinder, and a master hydraulic cylinder mounted on the vehicle frame, adapted to be actuated by said cylinder lever, and operatively connected to the first-mentioned hydraulic cylinders.

4. In a brake arrangement, a vehicle frame, a supporting wheel and axle assembly, a brake disc mounted thereon, a brake frame, brake levers pivotally fulcrumed thereon, friction means on said levers for engagement with said disc, means on said brake frame for actuating said levers, and support means for the brake frame comprising a link pivotally hung from the vehicle frame and resiliently connected to the brake frame, said resilient connection comprising resilient means adapted to resist in torsional shear lateral movement between the brake frame and the vehicle frame, and an additional connection between the brake frame and the vehicle frame, the last-mentioned connection comprising resilient means adapted to resist in direct shear said relative lateral movement.

5. In a brake arrangement, a vehicle frame, spaced supporting wheel and axle assemblies, rotatable brake discs mounted on said assemblies, a brake frame hung from the vehicle frame adjacent each disc, brake levers fulcrumed on said frame, friction shoes carried by respective levers for engagement with opposite sides of said disc, a hydraulic cylinder on each brake frame and operatively associated with adjacent levers, an air cylinder mounted on said vehicle frame, a dead cylinder lever fulcrumed from the vehicle frame and operatively connected to the air cylinder, and a master hydraulic cylinder mounted on the vehicle frame, adapted to be actuated by said cylinder lever, and operatively connected to the first-mentioned hydraulic cylinders.

6. In a brake arrangement, a truck, a supporting wheel and axle assembly, a rotatable member mounted thereon, friction means for engagement with said member, a brake frame comprising spaced lugs on the top thereof and spaced lugs on the end thereof remote from said member, a link pivotally connected between and to the first-mentioned lugs and to said truck, and a lug on the truck connected between and to the second-mentioned lugs, the last-mentioned connection comprising resilient means resisting in direct shear relative lateral movement between the brake frame and the truck, and the connection between the link and the spaced top lugs comprising resilient means adapted to resist in torsional shear said relative lateral movement, and actuating means on the brake frame operatively associated with said friction means.

7. In a brake arrangement for a railway car truck comprising a truck frame and supporting wheel and axle assemblies, brake rigging comprising an air cylinder device mounted on said frame, a cylinder lever fulcrumed on the frame and operatively connected to said device, a brake frame supported adjacent each assembly from said truck frame, friction means carried by said brake frame for engagement with braking surfaces of said assemblies, and a hydraulic actuating system for said friction means comprising auxiliary cylinders associated therewith, a master cylinder, a fluid connection between said master and auxiliary cylinders, and an operative connection between said cylinder lever and said master cylinder.

8. In a brake arrangement for a railway car truck comprising a wheel and axle assembly and a truck frame having an equalizer supported from said assembly and an upper frame member resiliently supported from said equalizer, friction means supported from said member for said assembly, and actuating means for said friction means comprising an auxiliary hydraulic cylinder associated therewith, a master hydraulic cylinder, means for conveying fluid from said master cylinder to said auxiliary cylinder, a lever fulcrumed from the truck frame and connected to said master cylinder, and an air cylinder device mounted on the truck frame and operatively connected to said lever.

9. In a brake arrangement for a railway car truck comprising a truck frame and a supporting wheel and axle assembly including an axle and a member rotatable therewith, a brake frame supported adjacent said assembly from said truck frame, friction means supported from the brake frame for engagement with said member, a hydraulic cylinder operatively associated with said friction means, a master hydraulic cylinder mounted on the truck frame, means for conveying fluid from said master cylinder to the first-mentioned cylinder, a cylinder lever fulcrumed from said truck frame and operatively connected to said master cylinder, and an air cylinder mounted on one of said frames and operatively connected to said lever.

10. In a brake arrangement, a truck frame, spaced supporting wheel and axle assemblies, brake discs mounted on said assemblies, friction means for engagement with respective discs, brake levers operatively connected to respective friction means, hydraulic cylinders associated with said levers, and power means comprising an air cylinder on said truck frame, a dead cylinder lever fulcrumed on said truck frame and operatively connected to said air cylinder, a master hydraulic cylinder, means conveying actuating fluid from said master hydraulic cylinder to said first-mentioned hydraulic cylinders, and an operative connection between said cylinder lever and said master hydraulic cylinder.

11. In a brake arrangement, a vehicle frame, a supporting wheel and axle assembly, a brake disc mounted thereon, a brake frame, brake levers pivotally fulcrumed thereon, friction means on said levers for engagement with said disc, means on said brake frame for actuating said levers, and support means for the brake frame comprising a link pivotally connected thereto and to said vehicle frame, and an additional connection between the brake frame and the vehicle frame, said connections being adapted to permit swinging movement of said brake frame laterally with respect to the vehicle frame, said link carrying resilient means fixed thereto and to said brake frame for resisting said movement in torsional shear.

12. In a brake arrangement, a truck, a supporting wheel and axle assembly, a rotatable member mounted thereon, friction means for engagement with said member, a brake frame comprising spaced lugs on the top thereof and spaced lugs on the end thereof remote from said member, a link pivotally connected between and to the first-mentioned lugs and to said truck, and a lug on the truck connected between and to the second-mentioned lugs, the last-mentioned connection comprising resilient means resisting movement of the brake frame afforded by said link, and actuating means on the brake frame operatively connected to said friction means.

13. In a brake arrangement for a railway car truck comprising a truck frame and a supporting wheel and axle assembly including an axle and a member rotatable therewith, friction means supported from the truck for engagement with said member, an auxiliary hydraulic cylinder operatively associated with said friction means, a master hydraulic cylinder device mounted on the truck frame and comprising a piston rod, means for conveying fluid from said device to said auxiliary cylinder, an air cylinder mounted on the frame, a lever having respective ends thereof fulcrumed from said frame and operatively connected to said air cylinder, said lever being directly connected intermediate the ends thereof to said rod.

14. In a brake arrangement for a railway car truck comprising a truck frame and a supporting wheel and axle assembly including an axle and a member rotatable therewith, friction means supported from the truck for engagement with said member, a hydraulic cylinder operatively associated with said friction means, a master hydraulic cylinder mounted on the truck frame, means for conveying fluid from said master cylinder to the first-mentioned cylinder, a cylinder lever fulcrumed at the inboard end thereof from said frame and operatively connected intermediate its ends to said master cylinder, and an air cylinder mounted on the frame and operatively connected to the outboard end of said lever.

15. In a brake arrangement for a railway car truck comprising a truck frame and a supporting wheel and axle assembly including an axle and a member rotatable therewith, a brake frame supported adjacent said assembly from said truck frame, friction means for engagement with inboard and outboard sides of said member, brake levers supporting respective friction means, said levers being pivotally fulcrumed on said brake frame, a hydraulic cylinder on said brake frame operatively associated with said levers, a dead cylinder lever fulcrumed from said truck frame, a master hydraulic cylinder mounted on said truck frame and operatively connected to said cylinder lever, an air cylinder on said truck frame operatively associated with said dead cylinder lever, and an operative connection between said master cylinder and said first-mentioned hydraulic cylinder.

16. In a brake arrangement, a vehicle frame, a supporting wheel and axle assembly including an axle and a member rotatable therewith, a brake frame, friction means supported from said brake frame for engagement with said member, a resilient connection between said vehicle frame and the top of said brake frame, and a pivotal and resilient connection between said vehicle frame and the end of said brake frame remote from said member, the last-mentioned connection comprising resilient means fixed to both of said frames and resisting in torsional shear pivotal movement of said brake frame afforded by said last-mentioned connection.

17. In a brake arrangement, a vehicle frame, a supporting wheel and axle assembly including an axle and a member rotatable therewith, a brake frame, brake levers pivotally fulcrumed thereon, friction means on said levers for engagement with said member, means on said brake frame for actuating said levers, and support means for the brake frame comprising a link pivotally hung from the vehicle frame and resiliently connected to the brake frame, said resilient connection comprising resilient means adapted to resist in torsional shear lateral movement between the brake frame and the vehicle frame, and an additional connection between the brake frame and the vehicle frame, the last-mentioned connection comprising resilient means adapted to resist in direct shear said relative lateral movement.

18. In a brake arrangement, a truck, a supporting wheel and axle assembly including an axle and a member rotatable therewith, a brake frame comprising spaced rigid means on the top thereof and spaced rigid means on the end thereof remote from said member, a link pivotally connected between and to the first-mentioned rigid means and to said truck, and rigid means on the truck connected between and to the second-mentioned rigid means, the last-mentioned connection comprising resilient means resisting in direct shear relative lateral movement between the brake frame and the truck, and the connection between the link and the first-mentioned rigid means comprising resilient means adapted to resist in torsional shear said relative lateral movement.

19. In a brake arrangement, a vehicle frame, a supporting wheel and axle assembly including an axle and a member rotatable therewith, a brake frame housing spaced from said assembly, power means on said brake frame housing, brake levers pivotally fulcrumed from said brake frame housing and engaged with said means, friction means supported from said levers for engagement with opposite sides of said member, and a support for said housing, said support being characterized by a connection between the top of said housing and said vehicle frame, and another connection between said vehicle frame and the end of said housing remote from said member, said first-mentioned connection including resilient means for resisting in torsional shear lateral movement of the housing with respect to the vehicle frame.

20. In a brake arrangement, a vehicle frame, a supporting wheel and axle assembly including an axle and a member rotatable therewith, a box-like brake frame housing spaced from said assembly, power means on said brake frame housing, brake levers pivotally fulcrumed from said brake frame housing and engaged with said means, friction means supported from said levers for engagement with opposite sides of said member, and a support for said brake frame housing, said support being characterized by a connection between the top of said brake frame housing and said vehicle frame, and another connection between said vehicle frame and the end of said brake frame housing remote from said member, said first-mentioned connection including a link pivoted to the vehicle frame and to the brake frame housing and carrying resilient means fixed to the brake frame housing, said resilient means resisting in torsional shear lateral movement of the brake frame housing with respect to the vehicle frame.

21. In a brake arrangement, a vehicle frame, a supporting wheel and axle assembly including an axle and a member rotatable therewith, a box-like brake frame housing spaced from said assembly, power means on said brake frame housing, brake levers pivotally fulcrumed from said brake frame housing and engaged with said means, friction means supported from said levers for engagement with opposite sides of said member, and a support for said housing, said support being characterized by a connection between the top of said housing and said vehicle frame, and another connection between said vehicle frame and the end of said housing remote from said member, both of said connections comprising resilient means adapted to resist relative movement between the vehicle frame and the brake frame housing.

22. In a railway truck, a vehicle frame, a supporting wheel and axle assembly, a brake frame, and means for supporting said brake frame from said vehicle frame, said means comprising a link pivotally depending from the vehicle frame and resiliently connected to said brake frame, said resilient connection comprising resilient means adapted to resist in torsional shear lateral movement between the brake frame and the vehicle frame, and an additional connection between the brake frame and vehicle frame, said last-mentioned connection comprising resilient means adapted to resist in direct shear said relative lateral movement.

23. In a railway truck, a vehicle frame, a supporting wheel and axle assembly, a brake frame, and means for supporting said brake frame from said vehicle frame, said means comprising a link pivotally connected thereto and to said vehicle frame, and an additional connection between the brake frame and the vehicle frame, said connections being adapted to permit swinging movement of said brake frame laterally with respect to the vehicle frame, said link carrying resilient means in engagement therewith and said brake frame for resisting said movement in torsional shear.

24. In a railway car truck, a vehicle frame, a supporting wheel and axle assembly, a brake frame, a pivotal and resilient connection between said vehicle frame and the end of said brake frame remote from said assembly, said resilient connection comprising resilient means adapted to resist in direct shear lateral movement between said vehicle frame and said brake frame, and an additional connection between said brake frame and said vehicle frame, said last-mentioned connection comprising resilient means adapted to resist in torsional shear said relative lateral movement.

CARL E. TACK.